（12）United States Patent
Herr et al.

(10) Patent No.: US 8,287,243 B2
(45) Date of Patent: Oct. 16, 2012

(54) SPINNER OF A WIND TURBINE (75) Inventors: Stefan Herr, Greenville, SC (US); Peter Gauchel, Münster (DE)

(73) Assignee: General Electric Company, Schenectady, NY (US)

( * ) Notice: Subject to any disclaimer, the term of this patent is extended or adjusted under 35 U.S.C. 154(b) by 1179 days.

(21) Appl. No.: 12/018,822

(22) Filed: Jan. 24, 2008

(65) Prior Publication Data

US 2009/0191064 A1 Jul. 30, 2009

(51) Int. Cl.
*F03D 11/00* (2006.01)

(52) U.S. Cl. ...................... 416/245 R; 29/889; 29/889.1; 29/889.3

(58) Field of Classification Search ............... 415/218.1, 415/219.1; 416/93 R, 93 A, 94, 245 R, 245 A; 290/44, 55; 29/889.1, 889.3, 889
See application file for complete search history.

(56) References Cited

U.S. PATENT DOCUMENTS

| 2,674,063 | A | * | 4/1954 | Irwin | 416/245 R |
|---|---|---|---|---|---|
| 3,102,679 | A | * | 9/1963 | Rudy | 415/218.1 |
| 3,146,007 | A | * | 8/1964 | Boivie et al. | 415/218.1 |
| 3,703,341 | A | * | 11/1972 | Garofalo | 416/245 R |
| 3,901,627 | A | * | 8/1975 | Sullivan | 416/245 R |
| 4,720,640 | A | * | 1/1988 | Anderson et al. | 416/93 R |
| 5,252,160 | A | * | 10/1993 | Scanlon et al. | 416/245 R |
| 5,702,233 | A | * | 12/1997 | Ouellette | 416/245 R |
| 6,358,014 | B1 | * | 3/2002 | Chou et al. | 416/245 R |
| 6,452,287 | B1 | * | 9/2002 | Looker | 290/55 |
| 6,814,542 | B2 | * | 11/2004 | Marlander et al. | 415/219.1 |
| 7,547,194 | B2 | * | 6/2009 | Schilling | 29/889.71 |
| 2003/0141721 | A1 | | 7/2003 | Bartlett | |
| 2005/0242233 | A1 | * | 11/2005 | Battisti | 244/58 |
| 2007/0009348 | A1 | * | 1/2007 | Chen | 415/2.1 |
| 2009/0148291 | A1 | | 6/2009 | Gerber | |

OTHER PUBLICATIONS

DK Patent Application No. PA200900775, Office Action, Jan. 25, 2010.

* cited by examiner

*Primary Examiner* — Christopher Verdier
(74) *Attorney, Agent, or Firm* — Global Patent Operation; Douglas D. Zhang (57) ABSTRACT

A spinner configured to be mounted on a hub of a wind turbine to which at least one rotor blade is connected. The spinner defines a front portion configured to be positioned in front of an inner portion of the at least one rotor blade, and is structurally configured to cover a substantial portion of the inner portion of the at least one rotor blade in a wind direction during operation of the wind turbine. Further described is a wind turbine comprising the above-described spinner and a method for increasing the efficiency of an existing wind turbine, wherein the method includes mounting the above-described spinner to the hub of a wind turbine.

20 Claims, 5 Drawing Sheets

Mounting a spinner on a hub of a wind turbine

Mounting a housing of a nacelle

Fig. 6

SPINNER OF A WIND TURBINE

BACKGROUND OF THE INVENTION

The present patent application relates to a spinner for wind turbines adapted to be mounted on a hub of a wind turbine. Further, it relates to a wind turbine with a spinner. Finally, it relates to a method for increasing the efficiency of an existing wind turbine Commonly, rotor blades of wind turbines have no good aerodynamic profile at the inner rotor section. The air flow in the inner rotor section man pass the rotor of the wind turbine without being used for energy production. Thus, not all kinetic energy of the wind passing an area that is swept by the rotor blades is used for the energy production.

BRIEF DESCRIPTION OF THE INVENTION

In view of the above, a spinner for a wind turbine is provided, the spinner is adapted to be mounted on a hub of said wind turbine, wherein the at least one rotor blade is connected to said hub, wherein the rotor blade has an inner portion and a profiled outer portion, wherein the spinner is adapted to cover a substantial portion of the inner portion of the rotor blade in wind direction, the spinner having a front portion, wherein the front portion is adapted to be positioned in front of the cylindrical inner portion of the at least one rotor blade of the wind turbine in operation.

According to a further aspect of the present patent application, a wind turbine is provided comprising a hub and at least one rotor blade connected to the hub, the rotor blade having an inner portion and a profiled outer portion, the wind turbine further comprising a spinner mounted on the hub, wherein the spinner is adapted to cover a substantial portion of the inner portion in wind direction, the spinner having a front portion, wherein the front portion is adapted to be positioned in front of the cylindrical inner portion of the at least one rotor blade of the wind turbine in operation.

According to a further aspect, a method is provided for increasing the efficiency of an existing wind turbine with at least one rotor blade being connected to a hub, the at least one rotor blade having an inner portion and a profiled outer portion, the method comprising: Mounting a spinner on the hub, wherein the spinner is adapted to cover a substantial portion of the inner portion in wind direction, the spinner having a front portion, wherein the front portion is positioned in front of the inner portion of the at least one rotor blade of the wind turbine in operation, wherein a back end of the front portion has a substantial smooth circumference.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Further, the commonly assigned and co-pending U.S. patent application Ser. No. 11/951,366, filed Dec. 6, 2007, entitled "Multi-section wind turbine rotor blades and wind turbines incorporating the same" is incorporated herein by reference in its entirety. That patent application yields to a multi-sectional blade with a fairing that is part of the rotor blade. The present patent application yields to a shielding or fairing of an inner portion of a rotor blade, wherein the shielding is part of the spinner.

Figure 1:
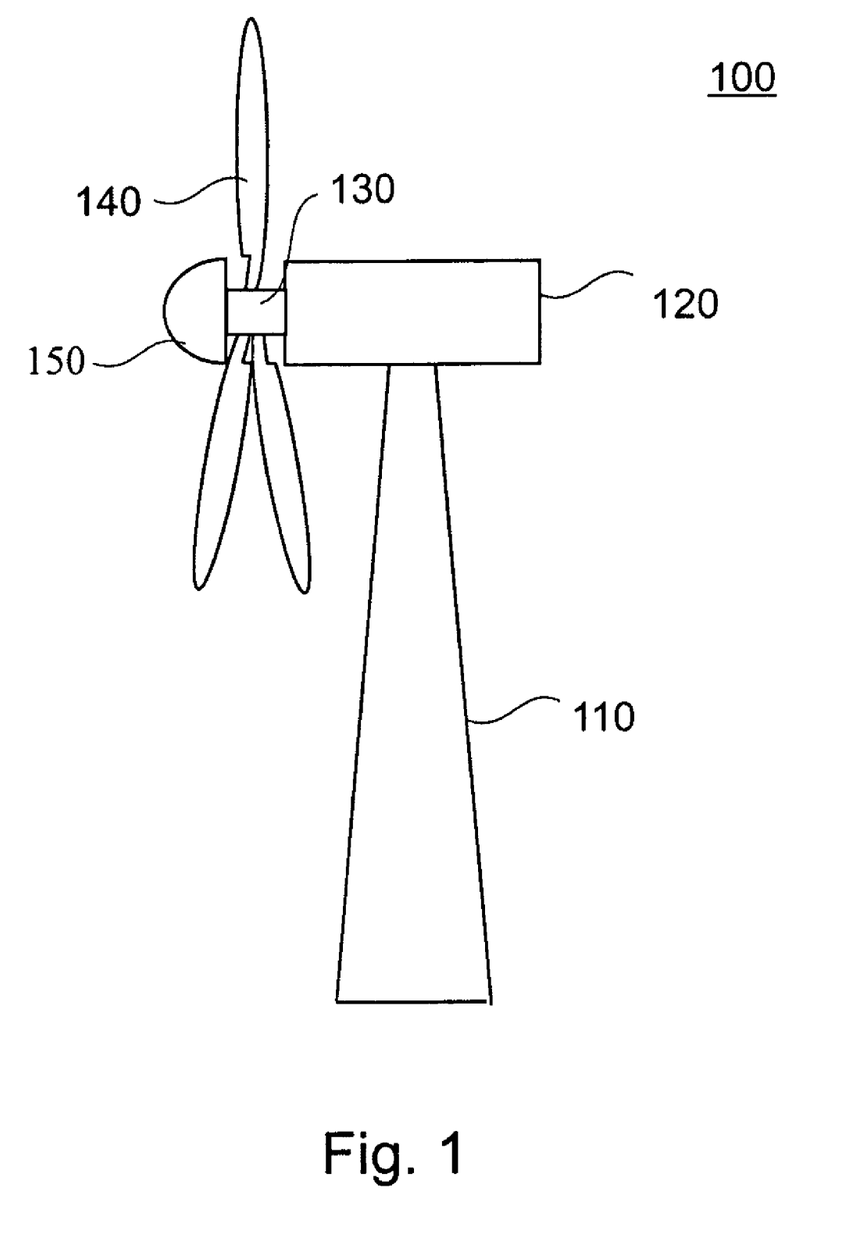
FIG. 1 shows schematical drawing of a wind turbine.

FIG. 1 shows a wind turbine 100. The wind turbine 100 includes a tower 110 onto which a nacelle 120 is arranged. Within the nacelle a generator (not shown) for producing electrical current is placed. The generator is connected to a hub 130 with a substantial horizontal shaft. Three rotor blades 140 are connected to the hub. The rotor blades 140 and the hub 130 are forming a rotor of the wind turbine 100. In operation the wind imparts a rotation on the rotor due to an aerodynamic profile on the rotor blades 140. Thus, the rotor turns around a substantially horizontal rotor axis X, which is substantially parallel to the wind direction. The rotor drives the generator, such that electrical energy is produced. Hence, kinetic energy of the wind is transformed into electrical energy.

Relative adjectives like in front, backward, behind and rear are defined with respect to the wind direction related to a wind turbine in operation, i.e. when the wind turbine produces electrical energy. That means that the wind flows from the front end to the back end of a wind turbine. The terms axial or radial relate to the rotor axis X of the hub, when the wind turbine produces electrical energy. Thus, the rotor axis X is substantially parallel to the wind direction.

Figure 2:
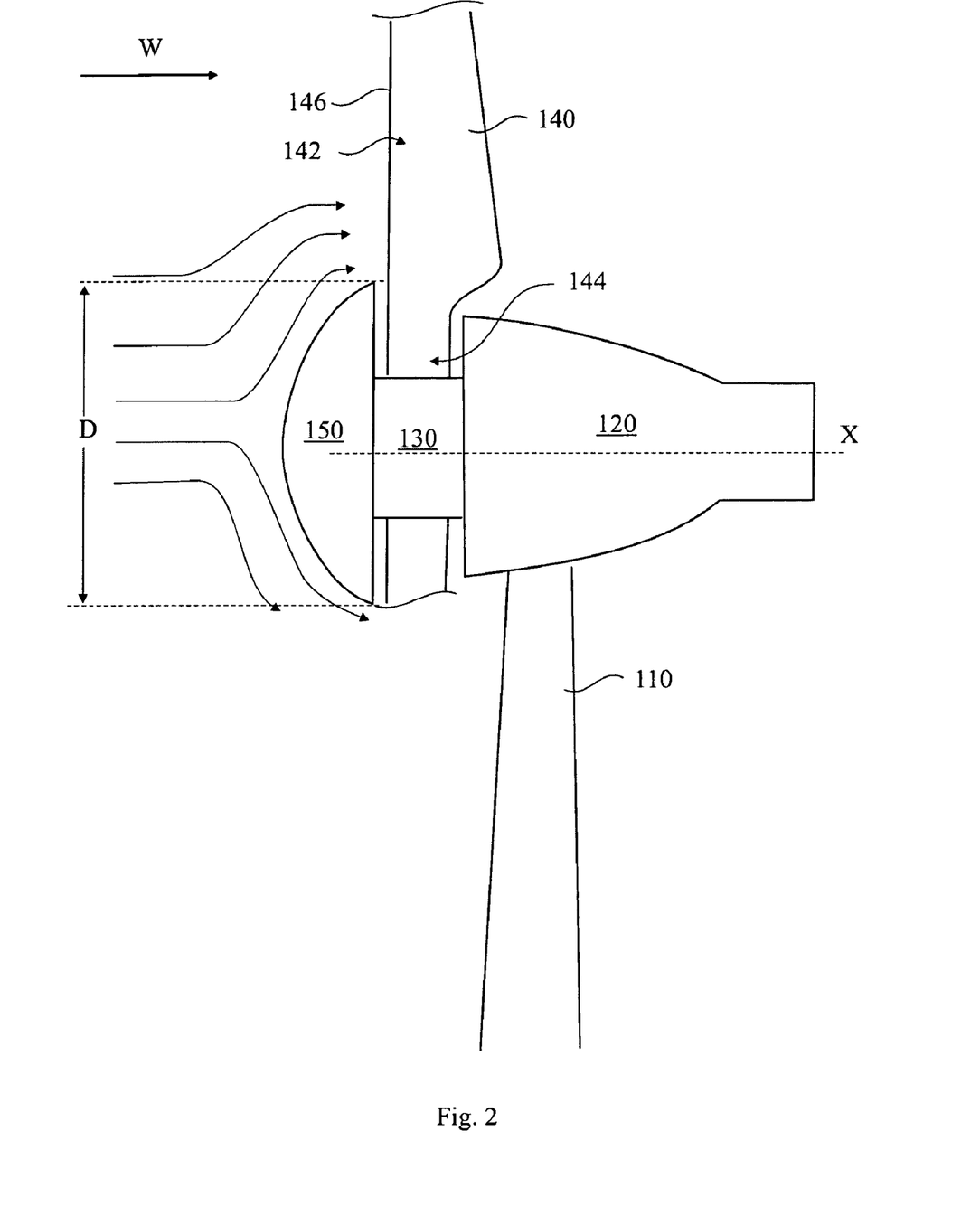
FIG. 2 shows a further schematical drawing of an embodiment of a wind turbine according to the present patent application.

In FIG. 2, a simplified schematic drawing of a wind turbine according to an embodiment of the present patent application is shown. The same reference numbers correspond to the same entities like in FIG. 1. For the sake of simplicity, only a part of the rotor blades 140 are shown. The rotor blade 140 has an outer section 142 and an inner section 144. Outer and inner are used with respect to the hub 130. Therefore, the outer section 142 of rotor blade 140 is radially outside of the inner section 144 in FIG. 2. The inner section or inner portion of the rotor blade 140 has in a typical embodiment a substantial cylindrical shape and is connected to the hub 130. The rotor blade 140 may be, in a typical embodiment, turned around its longitudinal axis to adjust a pitch angle. For that purpose a pitch mechanism is located in the hub 130 and/or the nacelle 120 of the wind turbine. The outer section or portion 142 of the rotor blade has a wing shaped profile, such that the outer section may also be called profiled section or profiled outer portion 142 of the rotor blade 140. The front end of the rotor blade 140 is typically straight from the connection to the hub to the outer section 142, in another typical embodiment of the present patent application to the blade tip of the rotor blade 140. Thus, a leading edge 146, i.e. the windward or front edge of the rotor blade, defines during operation of the wind turbine, i.e. when the hub 130 and the rotor blades 140 turns around the axis X, a substantially flat disk. Thus, the outer end of the inner cylindrical section 144, approximately where the profiled section begins, i.e. where the rotor blade starts the leeward protrusion in the embodiment shown in FIG. 2 when looking from a hub sided end of the rotor blade 140 to the blade tip, is defining a circle around the axis X.

In front, i.e. windward, of the rotor blades 140, a spinner 150 according to the present patent application is symmetrically placed with respect to the turning axis X. The spinner 150 may be connected to the hub 130, or later connected to an existing small spinner (not shown) already mounted on the hub of the wind turbine 100. In the last case, the spinner 150 covers the small spinner. Thus, the spinner 150 may be a nose cone of the hub 130. The spinner 150 is in a typical embodiment not only symmetrically placed with respect to the turning axis X but also symmetrical to the turning axis X, if mounted on a wind turbine 100. The spinner 150 may have a parabolical or semi-spherical outer shape. Further, the spinner 150 may include connectors for fixing the spinner 150 to the hub 130 or to the existing small spinner. Therefore, the spinner 150 according to the invention may be mounted on already existing wind turbines. The spinner 150 according to the present patent application guides wind that is directed to the hub 130 or to the nacelle 120 the profiled or outer sections 142 of the rotor blade 140. Thus, kinetic energy of the wind directed to the hub 130 is also used for transforming it to electrical energy.

For that purpose, the spinner has a maximum outer diameter D in front of the rotor blades 140 that is corresponding substantially to a diameter of the circle defined by the outer end of the inner cylindrical section 144 in operation of the wind turbine 100. The maximum outer diameter D might also be slightly greater than the circle. Hence, the wind directed to the hub 130 and the nacelle 120 is directed along the spinner 150 to the outer section 142 of the rotor blade 140.

The front portion of a spinner according to this patent application is a portion of the spinner that is located in front of the rotor blades 140, in particular located in front of the inner portion 144 of the rotor blades 140. In case of FIG. 2 the spinner 150 comprises only a front portion.

Figure 3:
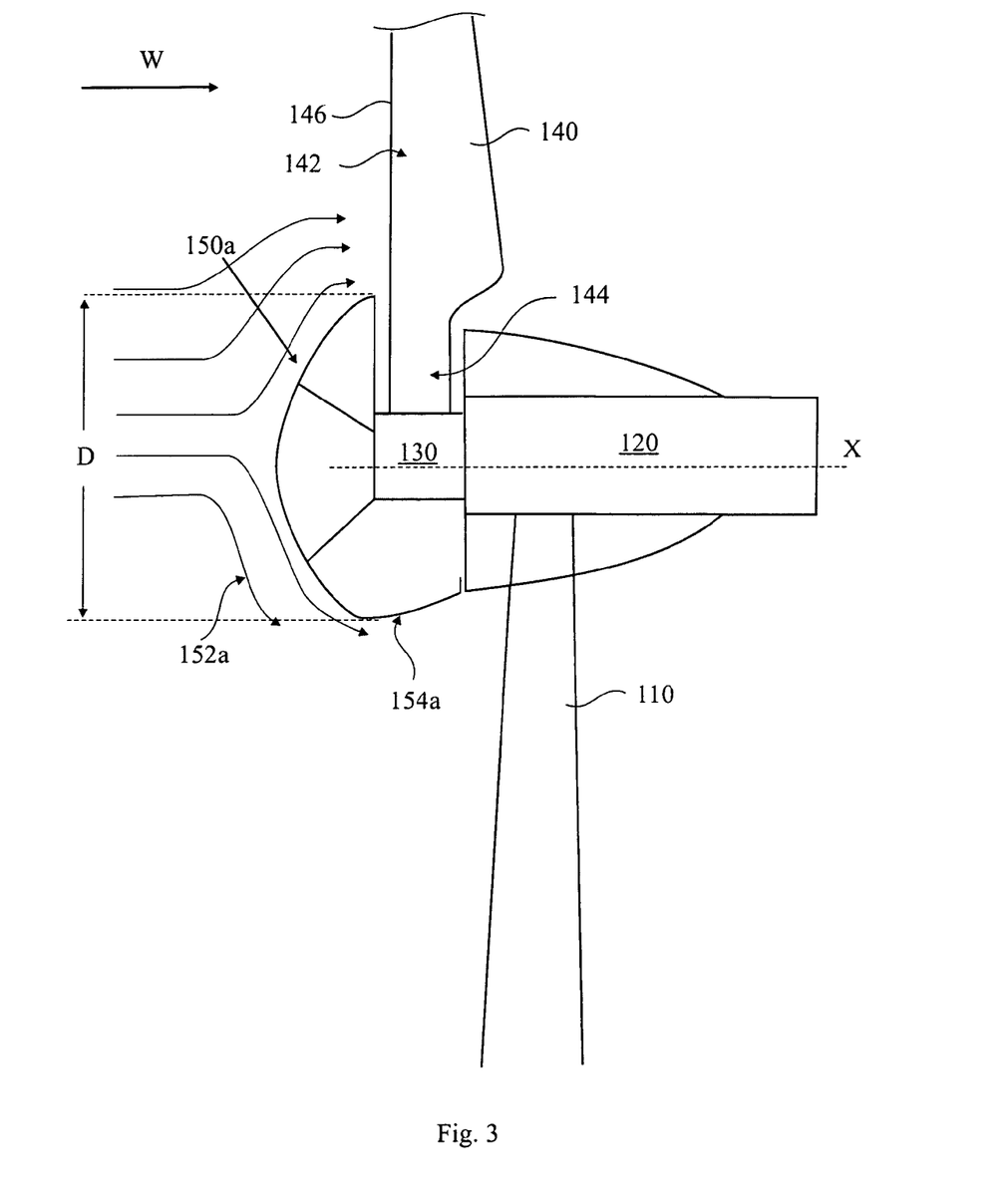
FIG. 3 shows a further schematical drawing of an embodiment of a wind turbine according to the present patent application.

In a further embodiment, shown in FIG. 3, the same features are designated with same reference numerals. The wind turbine 100 has a different spinner than in FIG. 2. A spinner 150a according to FIG. 3 has a front section 152a and a rear section 154a. The front section 152a is formed according the same principles as the spinner 150 described with respect to FIG. 2. Therefore, it may have a shape of a substantially spherical segment or a substantially paraboloid shape with a maximal outer diameter D of about diameter of the circle defined by the outer end of the inner cylindrical section 144 in operation of the wind turbine 100.

The rear section 154a of the spinner 150a is extending from the front section 152a, in particular a rear end of the front section 152a, in direction of a rear end of the nacelle 120. The rear section 154a may have an substantially cylindrical shape or may have a slightly diminishing diameter in direction of its backward end. In the latter case, the rear section 154a may have a conical shape. The backward section 154a encloses the hub 130 of the wind turbine. It presents only substantial circular cut outs for the (cylindrical) inner section 144 of the rotor blade 140. In any case the rear section 154a of the spinner 150a is formed such that the airfoiled shaped outer section 142 of the rotor blade 140 is not touching in any pitch angle of the rotor blade 140 the rear section 154a of the spinner 150a. Therefore, the spinner 150a is adapted to provide a low air resistance and to guide the wind to the airfoiled shaped outer section 142 of the rotor blade 140.

The embodiments described with respect to the FIGS. 2 and 3 may have a nacelle 120 with an outer shape that is adapted to a respective spinner. The nacelle 120, in particular its windward or front portion, may at least partially have paraboloid shape. Thus, the outer diameter of the nacelle 120 at its front end is greater than the outer diameter at the rear end of the nacelle. In a typical embodiment, the nacelle has at its front end, a circular section that has approximately the same diameter or a slightly smaller diameter than the diameter of the outer end of the inner cylindrical section 144 of the rotor blade 140 of the wind turbine 100 (in operation). Further, it may be dimensioned that the airfoiled outer section 142 of the rotor blade 140 could not touch the nacelle 120. Therefore, in a specific embodiment of the present patent application, the front end of the nacelle has a smaller diameter than the maximal outer diameter D of the spinner 150, 150a. And in another embodiment, the radial outer diameter of the front end of the nacelle substantially corresponds to a minimum diameter of the back end of the front portion of the spinner. Further, in a typical embodiment, the outer shape is adapted to enable a laminar flow of the wind around the spinner and the nacelle. Therefore, for example in the embodiment shown in FIG. 3, the wind turbine 100 presents a smooth transition front rear section 143a to the outer shape of the nacelle 120.

In case the nacelle has a cuboid shaped form, specific retrofitting parts may be mounted on the cuboid shaped nacelle 120, as shown schematically in FIG. 3. Hence, all external parts, namely the spinner according to the present patent application and the paraboloid shaped casing for the nacelle may be mounted on an existing wind turbine 100.

Figure 4:
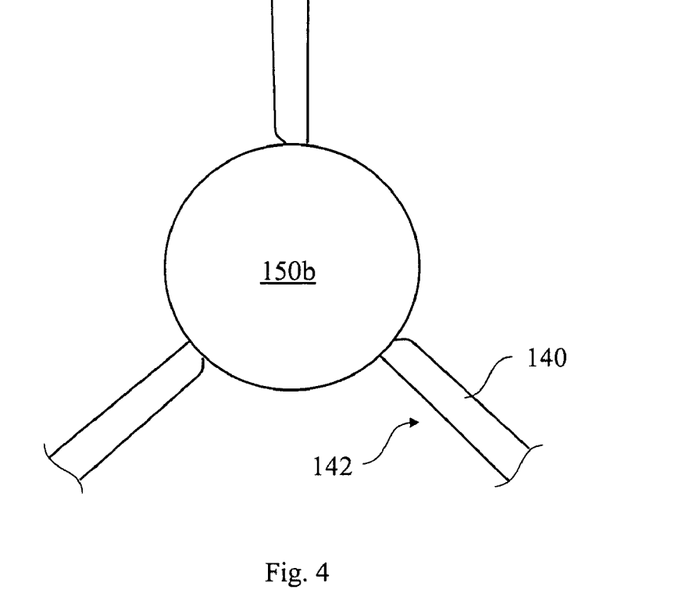
FIG. 4 shows a schematical front view of an embodiment of a spinner.

FIG. 4 shows a front view of an embodiment of a spinner 150c with a substantially circular shape in a front view. The spinner 150b may be have in this case a paraboloid shaped form or a form of a sphere segment. As it is shown in this embodiment, the substantial cylindrical inner portions 144 of the blade 140 are completely covered in wind direction. In some embodiments, only a substantial portion of the inner portions 144 might be covered by the spinner 150b in direction of the wind. A substantial portion of the inner portion may be 50 to 100 percent, 75 to 100 percent, or 90 to 100 percent of a total length of the inner cylindrical portion 144. The total length of the inner portion 144 is typically the distance from a connecting flange for connecting the rotor blade 140 to the hub 130 to the beginning of the airfoiled or profiled portion 142 of the rotor blade.

Figure 5:
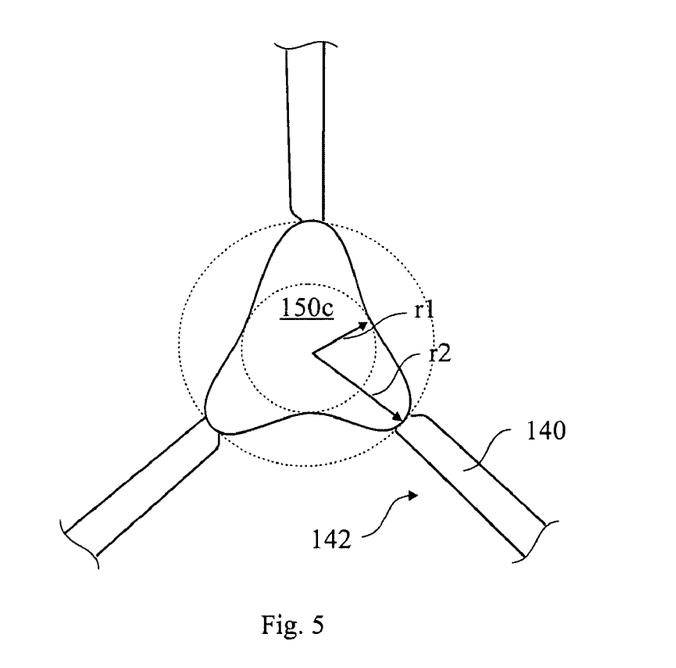
FIG. 5 shows a schematical front view of a further embodiment of a spinner.

In a further embodiment of the spinner, as shown in FIG. 5, the spinner 150c may not have in a front view a circular shape. The perimeter, in a front view, varies between two radii, an outer circle radius r2 and an inner circle radius r1. The diameter D explained with respect to the previous drawings may correspond to $D=2 \times r2$. The radius r2 is chosen such that the spinner 150c covers a substantial portion of the cylindrical inner portion 144 of the rotor blade 140. The inner circle radius r1 may be chosen in an embodiment that the spinner 150c substantially covers the nacelle 120 in wind direction. The outer circle radius is used to the circular position of the rotor blades 140. Further, in a specific embodiment, there is a smooth transition between the outer circle radius r2 and the inner circle radius r1, as shown in FIG. 5, in a front view of the spinner 150c. Therefore, the spinner 150c has a wave-shaped outer perimeter. Described another way, the back end of the front portion of the spinner has, in a front view, a substantially undulating circumference, and at least one wave peak configured to be positioned in front of the inner portion of the at least one rotor blade. Thus, there is no strong flow separation and no strong turbulences are created due to an abrupt transition between the outer circle radius r2 and the inner circle radius r1.

In a typical embodiment of the inventions the back end of the front portion of the spinner has a substantial smooth circumference. In a further embodiment, the back end of the front portion may have a smooth outer contour. This leads to a more aerodynamical shape of the spinner and less turbulences. This may, be adopted to the spinners shown in FIGS. 1 to 5.

Figure 6:
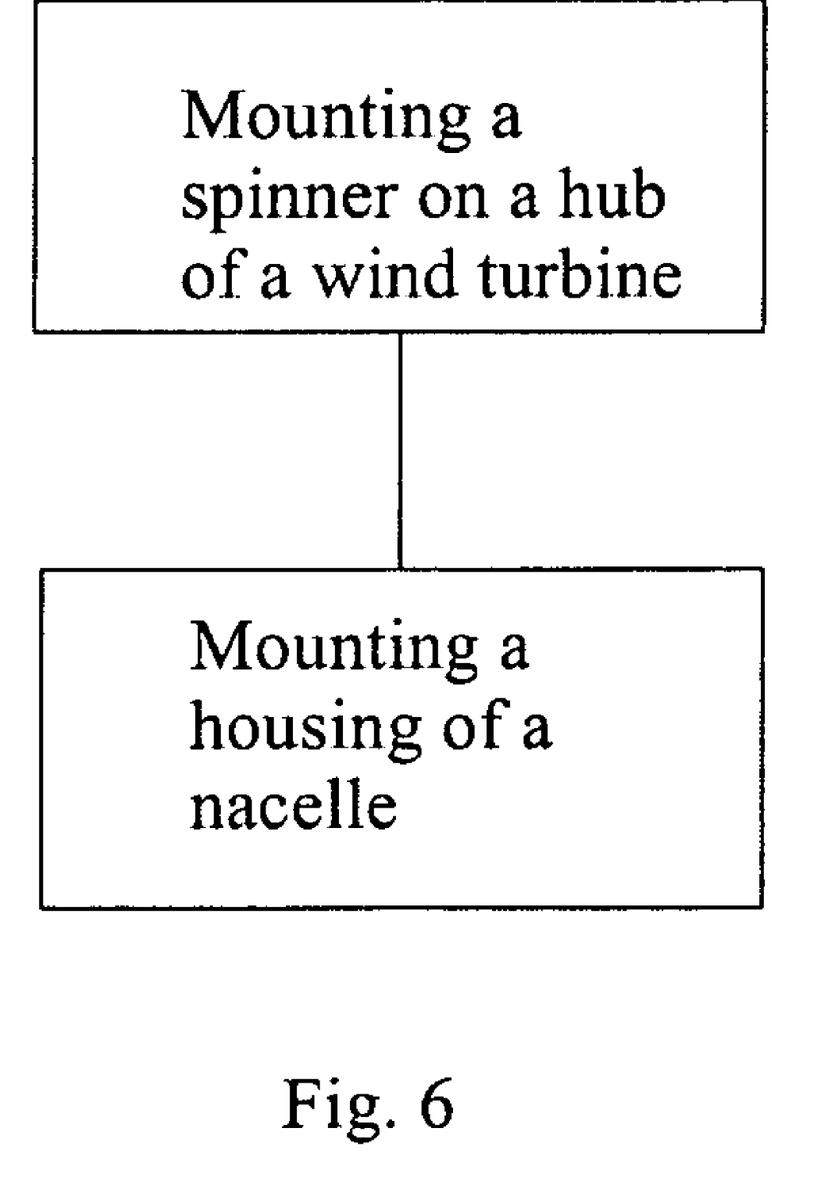
FIG. 6 shows a flow chart of a method for improving the efficiency of an existing wind turbine.

In FIG. 6 a method for improving the efficiency of an existing wind turbine is shown. In a first step, a spinner is mounted on the hub. The spinner may be one of the spinners described here-above. In a further step, a housing is mounted on the nacelle. The housing may be adapted to the form of the spinner as explained already here-above and may have a substantially paraboloid shape. In a further embodiment of the method, first the housing is mounted on the nacelle, and then the spinner is mounted on the hub.

Therefore, the spinner dimensions are increased or, in other words, a profiled plate is mounted in front of the spinner, such that the air impinging the wind turbine at the inner rotor diameter will be guided to profiled rotor blade sections and thus will increase the energy capture of the wind turbine. In a typical embodiment of the present patent application the outer dimensions of the nacelle may be adapted to the spinner to increase energy capture and to avoid vortex in the down flow wind stream. Therefore the energy capture is increased, and less energy is loss as the air stream at the inner rotor diameter is guided to the profiled rotor blade sections.

The spinner may be fabricated of any suitable material including, but not limited to carbon fiber and/or other construction material.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A spinner configured to be mounted on a hub of a wind turbine, wherein at least one rotor blade is connected to the hub and defines a blade tip, a substantially cylindrical inner portion extending radially from the hub to an outer end of the inner portion, and a profiled outer portion extending radially from the outer end of the inner portion toward the blade tip, the spinner comprising:
a front portion positioned in front of the inner portion of the at least one rotor blade of the wind turbine in operation;
wherein the spinner extends radially from the hub in a direction along the at least one rotor blade to a point beyond the outer end of the inner portion of the at least one rotor blade and completely covers the inner portion of the at least one rotor blade and a portion of the profiled outer portion of the at least one rotor blade in a wind direction, and is structurally configured to allow rotation of the at least one rotor blade about its longitudinal axis for pitch angle adjustment of the at least one rotor blade without interfering with the rotation.

2. The spinner according to claim 1, wherein the spinner has a shape of a substantially spherical segment.

3. The spinner according to claim 1, wherein the spinner has a substantially paraboloidal shape.

4. The spinner according to claim 1, further comprising a back portion configured to surround the hub and defining a cut out corresponding to each inner portion of the at least one rotor blade of said wind turbine.

5. The spinner according to claim 4, wherein the back portion has a diameter corresponding to a minimum diameter of a back end of the front portion of the spinner.

6. The spinner according to claim 1, wherein a back end of the front portion of the spinner has, in a front view, a substantial circular shape.

7. The spinner according to claim 1, wherein a back end of the front portion of the spinner has, in a front view, a substantially undulating circumference, and at least one wave peak configured to be positioned in front of the inner portion of the at least one rotor blade.

8. A wind turbine comprising:
a hub;
at least one rotor blade connected to the hub, the rotor blade comprising a blade tip, a substantially cylindrical inner portion extending radially from the hub to an outer end of the inner portion and a profiled outer portion extending radially from the outer end of the inner portion toward the blade tip; and
a spinner mounted on the hub and comprising a front portion positioned in front of the inner portion of the at least one rotor blade of the wind turbine in operation,
wherein the spinner extends radially from the hub in a direction along the at least one rotor blade to a point beyond the outer end of the inner portion of the at least one rotor blade and completely covers the inner portion of the at least one rotor blade and a portion of the profiled outer portion of the at least one rotor blade in a wind direction, and is structurally configured to allow rotation of the at least one rotor blade about its longitudinal axis for pitch angle adjustment of the at least one rotor blade without interfering with the rotation.

9. The wind turbine according to claim 8, wherein the spinner has a shape of a substantially spherical segment.

10. The wind turbine according to claim 8, wherein the spinner has a substantially paraboloidal shape.

11. The wind turbine according to claim 8, wherein the spinner further comprises a back portion, configured to surround the hub and defining a cut out corresponding to each cylindrical inner portion of the at least one rotor blade.

12. The wind turbine according to claim 11, wherein the back portion has a substantially cylindrical shape.

13. The wind turbine according to claim 11, wherein the back portion has a diameter corresponding to a minimum diameter of the back end of the front portion.

14. The wind turbine according to claim 8, further comprising a nacelle comprising a housing, the hub being connected to the nacelle, wherein the housing of the nacelle has a substantially paraboloidal shape, the radial diameter of the front end of the nacelle being greater than the radial diameter of the backward end of the nacelle.

15. The wind turbine according to claim 14, wherein the radial outer diameter of the front end of the nacelle substantially corresponds to a minimum diameter of the back end of the front portion of the spinner.

16. The wind turbine according to claim 14, wherein the radial outer diameter of the front end of the nacelle is smaller than the minimum diameter of the back end of the front portion of the spinner.

17. The wind turbine according to claim 8, wherein, in a front view, the back end of the front portion of the spinner has a substantially undulating circumference, wherein at least one peak being adapted to be positioned in front of the inner portion of the at least one rotor blade.

18. A method for increasing the efficiency of an existing wind turbine comprising a hub and at least one rotor blade connected to the hub, the at least one rotor blade comprising a blade tip, a substantially cylindrical inner portion extending radially from the hub to an outer end of the inner portion and a profiled outer portion extending radially from the outer end of the inner portion toward the blade tip, the method comprising:

mounting a spinner on the hub;

wherein the spinner extends radially from the hub in a direction along the at least one rotor blade to a point beyond the outer end of the inner portion of the at least one rotor blade so that the spinner completely covers the inner portion of the at least one rotor blade and a portion of the profiled outer portion of the at least one rotor blade in a wind direction; and wherein the spinner is structurally configured to allow rotation of the at least one rotor blade about its longitudinal axis for pitch angle adjustment of the at least one rotor blade without interfering with the rotation.

19. The method according to claim 18, wherein an existing spinner is removed before mounting the spinner.

20. The method according to claim 18, wherein the wind turbine comprises a nacelle and the hub is connected to the nacelle, the method further comprising: mounting a housing on the nacelle, wherein the housing of the nacelle has a substantially paraboloidal shape and a radial diameter of a front end of the nacelle is greater than a radial diameter of a backward end of the nacelle.

* * * * *

UNITED STATES PATENT AND TRADEMARK OFFICE
CERTIFICATE OF CORRECTION

PATENT NO.        : 8,287,243 B2                                    Page 1 of 1
APPLICATION NO.   : 12/018822
DATED             : October 16, 2012
INVENTOR(S)       : Stefan Herr et al.

It is certified that error appears in the above-identified patent and that said Letters Patent is hereby corrected as shown below:

In Column 1, Line 12, delete "man" and insert -- may --, therefor.

In Column 1, Line 61, delete "turbine." and insert -- turbine; --, therefor.

In Column 4, Line 12, delete "has" and insert -- has, --, therefor.

In Column 5, Line 7, delete "inventions" and insert -- invention, --, therefor.

In Column 5, Line 12, delete "may," and insert -- may --, therefor.

In Column 6, Line 36, Claim 8, delete "operation," and insert -- operation; --, therefor.

In Column 6, Line 52, Claim 11, delete "portion," and insert -- portion --, therefor.

Signed and Sealed this
Twenty-second Day of January, 2013

David J. Kappos
*Director of the United States Patent and Trademark Office*